H. SUMMERFIELD.
ANTISKID CLAMP.
APPLICATION FILED FEB. 11, 1920.
1,369,363.
Patented Feb. 22, 1921.
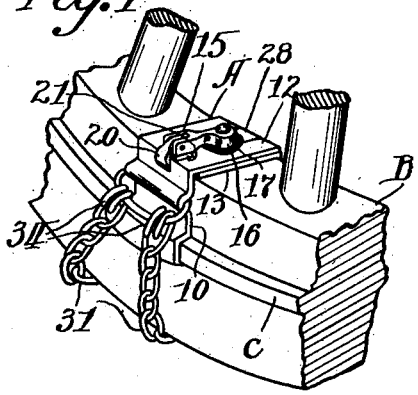
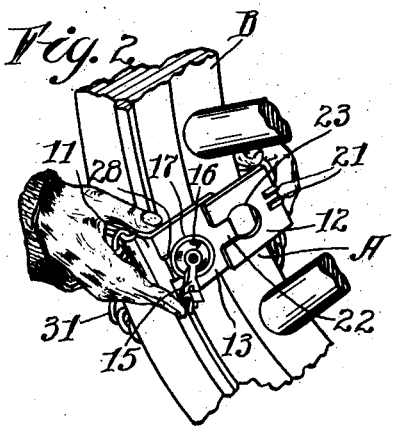
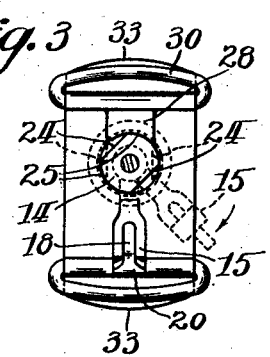
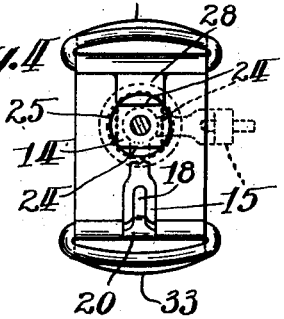
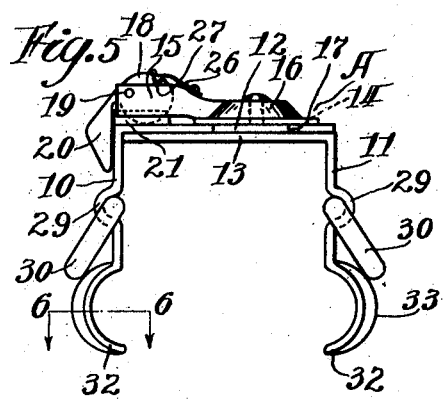
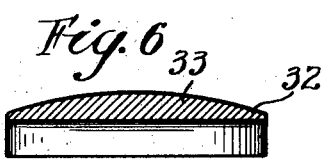
Inventor:
Harry Summerfield
by: Arnau Piche
Attorney.

UNITED STATES PATENT OFFICE.

HARRY SUMMERFIELD, OF ST. PAUL, MINNESOTA.

ANTISKID-CLAMP.

1,369,363.   Specification of Letters Patent.   Patented Feb. 22, 1921.

Application filed February 11, 1920. Serial No. 357,879.

*To all whom it may concern:*

Be it known that I, HARRY SUMMERFIELD, a citizen of the United States, residing at St. Paul, in the county of Ramsey and State of Minnesota, have invented a new and useful Improvement in Antiskid-Clamps, of which the following is a specification.

My invention relates to an anti-skid clamp, primarily for vehicle wheels, the clamp being constructed to engage firmly against the felly of the motor wheel to hold anti-skidding means in place across the tread of a tire.

A feature of the invention is the simple operation of the anti-skid clamp and the easy manner in which the clamp can be attached to the wheel felly and also the simple construction of the clamp.

A further object of the invention is providing a locking member which is separated by a lever to rigidly lock against possible chance of accidental disengagement of the parts of the clamp from a wheel felly and to readily disengage the same when it is desired.

The features and particular construction of the various members of my clamp will be more fully set forth in the following specification and claims.

In the drawings forming part of this specification:

Figure 1 is a perspective view of a portion of a motor vehicle wheel, illustrating my anti-skid clamp attached thereto and as it would appear in use.

Fig. 2 is a perspective view of a portion of a motor vehicle wheel and illustrating the act of applying my clamp to the same.

Fig. 3 is a plan view of the clamp, a portion of which is broken away to illustrate the locking lug and also illustrating, in dotted outline, the unlocking position of the lug in connection with the operating lever attached thereto.

Fig. 4 is a plan view similar to Fig. 3, illustrating the locking lug attached to the lever in a different relation and position from that illustrated in Fig. 3.

Fig. 5 is a side elevation of the clamp.

Fig. 6 is a section on the line 6—6 of Fig. 5.

In the drawings, the clamp A is formed of two angular-shaped members 10 and 11 having side portions which engage the sides of the felly B of a wheel. Ends 12 and 13 are formed extending approximately at right angles to the portions 10 and 11 and overlap when the clamp A is in position on the felly B.

A cam locking lug 14 is pivotally secured to the end or member 13 and the cam is rotated by the operating lever 15, which is rigidly attached in a suitable manner or formed integral with the cam lug 14. The lever 15 is formed with a head portion 16, having a transversely extending flange 17 projecting from the lower edge of the same. The operating lever 15 is bifurcated on its free end and carries a cam locking key 18, which is pivoted at 19 to the bifurcated ends of the lever 15 and is formed with an operating or engaging lever or arm 20. When the arm or lever 15 is in locking position and the members 10 and 11 have their ends 13 and 14 overlapping and engaging each other, the cam locking key 18 engages between the lugs 21 projecting from the surface of the end 12 and the lever 20 moved into position to set the key in locking position, as illustrated in Figs. 1 and 5. In this manner the lever 15 is held against movement and prevented from accidentally unlocking. The cam surface of the key 18 extends over the center of its pivot point 19 and it is understood that there is sufficient play between the ends 12 and 13 and the lever 15 to allow the key tc be moved into locking position. The locking key 18 also tends to cause the adjacent faces of the ends 12 and 13 to be drawn together.

A cam receiving slot 22 is formed in the end 12 of the member 10, which terminates in an enlarged circular portion 23. In securing the clamp A to the felly B, the lever 15 is turned into position to aline the flattened sides 24 of the cam with the sides of the slot 22, and as the cam width diametrically between the sides 14 is slightly less than the width of the slot 22, the cam member 14 is allowed to slide freely into the circular enlarged portion 23. The position of the lever to aline the faces 24 with the sides of the slot 22 to allow the cam to be inserted into the opening 23 is as illustrated in dotted outline in Fig. 3. The cam lug 14 is formed with circular shaped surfaces 25 and the diametrical width between the same is slightly less than the circular enlarged portion 23 at the end of the slot 22 so that when the cam lug 14 has been inserted into the recess 23 and the lever 15 is in the position illustrated in dotted outline, Fig. 3, by moving the lever 15 in the direction indicated by the arrow to the position of the lever illustrated in full lines, the cam 14 will be rotated into the position illustrated in full lines and thus lock the same in the opening 23 to hold the members 10 and 11 locked together. When the lever 15 is in this locking position the locking key 18 is turned into position to engage between the lugs 21, as illustrated in Figs. 1 and 5, to rigidly clamp and hold the lever 15 in locking position.

A spring 26, which is secured to the lever 15, engages in the notch 27 of the key 18 when the same is in locking position to assist in holding the key against free movement in the construction illustrated in Fig. 5.

It is obvious that the cam 14 can be positioned in any relative relation to the handle 15 as in some instances the spokes of the wheels may be too close together to allow the lever 15 to be swung at right angles transversely to the ends 12 and 13 of the clamp. It may be desired, however, in some constructions to place or secure the cam lug 14 with the sides 24 in alinement with the longitudinal axis of the handle 15, as is illustrated in Fig. 4. In this construction it is necessary to turn the handle 15 into the position illustrated in dotted outline to aline the surfaces 24 with the sides of the slot 22.

When the ends 12 and 13 are overlapping each other and the clamp A is in position on the felly B, the slot 22 engages a guide lug 28, which is formed projecting from the outer surface of the member 13 and tends to brace or support the ends of the member 12 to hold the member 11 in alinement with the member 10 when the clamp is secured to the wheel.

Transversely extending recesses 29 are formed in the sides of the members 10 and 11, which pivotally hold the loops 30 to which the ends of the anti-skid chains 31 are attached in a suitable manner. The anti-skid chains 31 connect the members 10 and 11 of the clamp together but the members 10 and 11 are separable from each other through the operation of the cam 14 and lever 15, and this construction allows the clamp A to be readily attached to a wheel as illustrated in Fig. 2.

The members 10 and 11 are formed with rim engaging ends 32, which are formed curved to fit the shape of the rim to which they are to be attached so as to engage snugly over the rim C when the clamp is in position on the wheel. The rim engaging ends 2 are formed with a central bulged portion 33 to form a cam surface transversely along their outer face with the highest portion at the central, longitudinal axis of the clamp A. In this manner the bulge forms a cam to give a natural spreading action to the ends 34 of the anti-skid chains or means 31. Thus the cam shaped rim engaging ends 32 tend to separate the ends 34 of the anti-skid members when the clamp A is in use, and hold the same in the most effective manner. This feature of the invention is of importance as it will readily be seen that the chains or anti-skid members tend at times to draw together, owing to the pull of the wheel to which they are attached.

The flange 17 of the lever 15 holds the cam 14 into engagement in the slot 22 and the recess 23 to give a close fit to the parts so that when the lever 15 is turned into locking position the clamp A is held rigidly to the felly B. It is obvious, however, that the cam 14 can be made of any suitable shape to lock the overlapping ends 12 and 13 together and thereby lock the clamp A to the wheel in a simple and most effective manner.

I have illustrated a particular construction of device to show one way of carrying out my invention, but I desire to have it understood that the drawings are only illustrative and that the invention can be carried out by other means and applied to other uses within the scope of the following claims:

What I claim is:

1. An anti-skid clamp, comprising two angular members, a cam pivoted to one of said members, a lever for operating said cam, a cam slot in the other of said members and a cam opening in which said cam is adapted to be rotated into locking position to lock said clamp to a wheel felly to hold anti-skid means thereto.

2. An anti-skid clamp, including two plate-like members, with overlapping ends, a slot terminating in an enlarged end formed in one of said ends, a locking cam pivotally secured to the other of said ends and a lever secured to said cam and adapted to operate the same into locking or unlocking position in the enlarged portion of said slot.

3. A clamp for a motor vehicle wheel, comprising separable plates, ends formed on each of said plates adapted to overlap when said clamp is positioned on the wheel felly, a cam receiving slot formed in one of said overlapping ends, a cam having an operating lever pivotally secured to the other of said plates and a locking key in the upper end of the operating lever adapted to engage the overlapping end having said slot formed therein to hold the cam in locked position to rigidly attach the clamp to a wheel felly.

4. A clamp for an anti-skid means, comprising a pair of angular felly gripping plates, a cam locking lug pivotally secured to one of said plates, a slot for receiving said lug connected with a cam receiving recess formed in the other of said plates and a lever having locking means attached to the free end thereof adapted to operate said cam lug.

5. An anti-skid clamp, comprising a pair of angular plates, ends adapted to overlap when said clamp is in operating position, a slot terminating in an enlarged portion formed in one of said overlapping ends, a cam locking lug adapted to be passed freely into said enlarged portion when in locking position, a lever for rotating said lug and adapted to hold it in locking position to clamp said angular members to a wheel felly and a guide lug adapted to engage in said slot to aline said angular members when in clamping position.

6. An anti-skid clamp, comprising felly clamping plates, an open slot formed in one of said plates, an enlarged inner end formed in said slot, a cam locking lug pivotally secured to the other of said plates, an operating lever for said lug and a cam shaped locking key pivotally secured to said lever and adapted to engage said plate having said slot formed therein to lock said lever in position to lock the plates of said clamp together.

7. A clamp for a motor wheel felly, comprising a pair of gripping plates, overlapping ends, a locking lug pivotally secured to one of said ends, a lever for operating said lug, a bifurcated end formed on said lever, a locking key pivoted in said bifurcated end, spring means adapted to engage said key to hold it against free rotary movement, lugs formed on the other of said plates between which said key is adapted to engage and a lug engaging slot formed in said last mentioned plate in which said lug is adapted to be locked to hold said plates locked to the felly of a wheel.

HARRY SUMMERFIELD.